(12) United States Patent
Huang et al.

(10) Patent No.: US 10,324,604 B2
(45) Date of Patent: Jun. 18, 2019

(54) ELECTRONIC DEVICE AND METHOD FOR CONTROLLING ZOOMING OF DISPLAYED OBJECT

(71) Applicant: Huawei Device Co., Ltd., Dongguan (CN)

(72) Inventors: Wen Huang, Beijing (CN); Jianchun Zhang, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 15/432,682

(22) Filed: Feb. 14, 2017

(65) Prior Publication Data
US 2017/0160913 A1    Jun. 8, 2017

Related U.S. Application Data

(63) Continuation of application No. 14/107,129, filed on Dec. 16, 2013, now Pat. No. 9,632,680, which is a
(Continued)

(51) Int. Cl.
*G06F 3/041* (2006.01)
*G06F 3/0484* (2013.01)
*G06F 3/0488* (2013.01)

(52) U.S. Cl.
CPC ........ *G06F 3/04845* (2013.01); *G06F 3/0414* (2013.01); *G06F 3/04883* (2013.01); *G06F 2203/04806* (2013.01)

(58) Field of Classification Search
CPC ......... G06F 3/0488; G06F 2203/04806; G06F 3/04845; G06F 3/04842; G06F 3/0485; G06F 3/0354
See application file for complete search history.

(56) References Cited

U.S. PATENT DOCUMENTS 8,310,456 B2 * 11/2012 Kim ...................... G06F 3/0485
345/173
8,477,115 B2    7/2013 Rekimoto
(Continued)

FOREIGN PATENT DOCUMENTS

CN          1881146 A      12/2006
CN        101498985 A       8/2009
(Continued)

OTHER PUBLICATIONS

Machine Translation and Abstract of Chinese Publication No. CN101923438, Dec. 22, 2010, 19 pages.
(Continued)

*Primary Examiner* — Duc Q Dinh
(74) *Attorney, Agent, or Firm* — Conley Rose, P.C.

(57) ABSTRACT

An electronic device and a method for controlling zooming of a displayed object includes receiving a single-point slide operation performed by a user on a displayed object of a touch screen, generating a slide signal, parsing the slide signal to obtain a slide track and a feature value of the single-point slide operation, determining whether the feature value of at least one point in the single-point slide operation is greater than a preset value, and controlling zooming of the displayed object according to the slide track when the feature value is greater than the preset value. A slide track and a feature value of a single-point slide operation of a user are identified, and zooming of a displayed object of the touch screen is controlled when the feature value is greater than a preset value.

14 Claims, 10 Drawing Sheets

Related U.S. Application Data continuation of application No. PCT/CN2012/082434, filed on Sep. 29, 2012.

(56) References Cited

U.S. PATENT DOCUMENTS

| | | | |
|---|---|---|---|
| 2006/0284858 A1 | 12/2006 | Rekimoto | |
| 2008/0129759 A1 | 6/2008 | Jeon et al. | |
| 2009/0006991 A1* | 1/2009 | Lindberg | G06F 3/04817 715/763 |
| 2009/0237421 A1 | 9/2009 | Kim et al. | |
| 2010/0289825 A1 | 11/2010 | Shin et al. | |
| 2010/0315438 A1 | 12/2010 | Horodezky et al. | |
| 2011/0012927 A1 | 1/2011 | Lin et al. | |
| 2011/0018695 A1 | 1/2011 | Bells et al. | |
| 2011/0043662 A1 | 2/2011 | Kim et al. | |
| 2011/0095993 A1* | 4/2011 | Zuverink | G06F 3/04847 345/173 |
| 2011/0109581 A1 | 5/2011 | Ozawa et al. | |
| 2011/0248948 A1* | 10/2011 | Griffin | G06F 3/041 345/174 |
| 2012/0026201 A1 | 2/2012 | Amano | |
| 2012/0038577 A1 | 2/2012 | Brown et al. | |
| 2012/0050332 A1 | 3/2012 | Nikara et al. | |
| 2012/0146930 A1 | 6/2012 | Lee | |
| 2012/0147052 A1 | 6/2012 | Homma et al. | |
| 2012/0162103 A1 | 6/2012 | Kobayashi et al. | |
| 2013/0088438 A1 | 4/2013 | Shih et al. | |
| 2013/0293588 A1 | 11/2013 | Yu | |
| 2014/0313130 A1 | 10/2014 | Yamano et al. | |

FOREIGN PATENT DOCUMENTS

| | | |
|---|---|---|
| CN | 101630223 A | 1/2010 |
| CN | 101923438 A | 12/2010 |
| CN | 101957678 A | 1/2011 |
| CN | 101963887 A | 2/2011 |
| CN | 101996044 A | 3/2011 |
| CN | 102084327 A | 6/2011 |
| CN | 102314305 A | 1/2012 |
| CN | 102346650 A | 2/2012 |
| CN | 102460364 A | 5/2012 |
| CN | 102541319 A | 7/2012 |
| CN | 102591550 A | 7/2012 |
| CN | 102629183 A | 8/2012 |
| EP | 2000896 A2 | 12/2008 |
| EP | 2256609 A2 | 12/2010 |
| EP | 2306288 A1 | 4/2011 |
| EP | 2328069 A2 | 6/2011 |
| JP | 2002281365 A | 9/2002 |
| JP | 2010271774 A | 12/2010 |
| JP | 2011039845 A | 2/2011 |
| JP | 2011053974 A | 3/2011 |
| JP | 2012208684 A | 10/2012 |
| KR | 20090102727 A | 9/2009 |
| KR | 20110088719 A | 8/2011 |
| KR | 20120027516 A | 3/2012 |
| WO | 2013094371 A1 | 6/2013 |

OTHER PUBLICATIONS

Machine Translation and Abstract of Chinese Publication No. CN102541319, Jul. 4, 2012, 32 pages.
Machine Translation and Abstract of Chinese Publication No. CN102346650, Feb. 8, 2012, 9 pages.
Machine Translation and Abstract of Japanese Publication No. JP2002281365, Sep. 27, 2002, 21 pages.
Machine Translation and Abstract of Japanese Publication No. JP2011039845, Feb. 24, 2011, 19 pages.
Partial English Translation and Abstract of Japanese Patent Application No. JP2010271774A, Part 1, Apr. 8, 2015, 4 pages.
Partial English Translation and Abstract of Japanese Patent Application No. JP2010271774A, Part 2, Apr. 8, 2015, 13 pages.
Partial English Translation and Abstract of Japanese Patent Application No. JP2011053974A, Part 1, Mar. 27, 2015, 5 pages.
Partial English Translation and Abstract of Japanese Patent Application No. JP2011053974A, Part 2, Mar. 27, 2015, 18 pages.
Foreign Communication From a Counterpart Application, Chinese Application No. 201280002625.0, Chinese Search Report dated May 4, 2015, 3 pages.
Foreign Communication From a Counterpart Application, Chinese Application No. 201280002625.0, Chinese Office Action dated Jun. 2, 2015, 11 pages.
Foreign Communication From a Counterpart Application, Chinese Application No. 201280002625.0, Chinese Office Action dated Feb. 5, 2016, 9 pages.
Foreign Communication From a Counterpart Application, European Application No. 12877602.8, Extended European Search Report dated Jun. 25, 2014, 7 pages.
Foreign Communication From a Counterpart Application, European Application No. 12877602.8, European Office Action dated Aug. 30, 2016, 7 pages.
Foreign Communication From a Counterpart Application, Korean Application No. 10-2013-7033058, Korean Notice of Allowance with Brief Translation dated Nov. 30, 2015, 3 pages.
Foreign Communication From a Counterpart Application, Korean Application No. 10-2013-7033058, Korean Office Action dated Apr. 30, 2015, 4 pages.
Foreign Communication From a Counterpart Application, Korean Application No. 10-2013-7033058, English Translation of Korean Office Action dated Apr. 30, 2015, 2 pages.
Foreign Communication From a Counterpart Application, Japanese Application No. 2014537470, Japanese Notice of Allowance dated Aug. 4, 2015, 3 pages.
Foreign Communication From a Counterpart Application, Japanese Application No. 2014-537470, Japanese Office Action dated Feb. 10, 2015, 2 pages.
Foreign Communication From a Counterpart Application, Japanese Application No. 2014-537470, English Translation of Japanese Office Action dated Feb. 10, 2015, 2 pages.
Foreign Communication From a Counterpart Application, PCT Application No. PCT/CN2012/082434, English Translation of International Search Report dated Jul. 11, 2013, 2 pages.
Foreign Communication From a Counterpart Application, PCT Application No. PCT/CN2012/082434, English Translation of Written Opinion dated Jul. 11, 2013, 13 pages.
Office Action dated Jun. 27, 2016, 12 pages, U.S. Appl. No. 14/107,129, filed Dec. 16, 2013.
Office Action dated Feb. 8, 2016, 16 pages, U.S. Appl. No. 14/107,129, filed Dec. 16, 2013.
Office Action dated Sep. 10, 2015, 24 pages, U.S. Appl. No. 14/107,129, filed Dec. 16, 2013.
Notice of Allowance dated Nov. 28, 2016, 10 pages, U.S. Appl. No. 14/107,129, filed Dec. 16, 2013.
Office Action dated May 13, 2016, 4 pages, U.S. Appl. No. 14/107,129, filed Dec. 16, 2013.
Foreign Communication From a Counterpart Application, European Application No. 12877602.8, European Office Action dated Feb. 18, 2019, 6 pages.

* cited by examiner

ELECTRONIC DEVICE AND METHOD FOR CONTROLLING ZOOMING OF DISPLAYED OBJECT

CROSS-REFERENCE TO RELATED APPLICATIONS

This application is a continuation of U.S. patent application Ser. No. 14/107,129 filed on Dec. 16, 2013, which is a continuation of International Patent Application No. PCT/CN2012/082434 filed on Sep. 29, 2012, both of which are hereby incorporated by reference in their entireties.

TECHNICAL FIELD

The present disclosure relates to the field of communications technologies, and in particular, to an electronic device for controlling zooming of a displayed object and a method for controlling zooming of a displayed object.

BACKGROUND

Electronic devices having touch screens are increasingly favored by consumers, for example, devices such as a smartphone, a tablet computer, and a personal digital assistant (PDA). Usually a user performs slide and touch operations on a touch screen to perform zooming processing on a browsed page. For multi-touch of a smartphone, a relative sliding distance of two fingers on a touch screen is sensed in order to control zooming out or zooming in of a page.

In some other approaches, although various page display control technologies are available, two fingers always need to be used to operate a touch screen to realize zooming of a page. Usually, one hand holds an electronic device, and the other hand performs zooming control. It is difficult to hold an electronic device and at the same time perform a zooming operation using a single hand.

SUMMARY

Accordingly, embodiments of the present disclosure provide a method and an electronic device for controlling zooming of a displayed object such that a zooming operation can be performed with a single hand holding an electronic device.

In a first aspect, a method for controlling zooming of a displayed object is provided and includes receiving a single-point slide operation performed by a user on a displayed object of a touch screen, and generating a slide signal, parsing the slide signal to obtain a slide track and a feature value of the single-point slide operation, where the feature value is at least one of a touch pressure and a contact area, determining whether the feature value of at least one point in the single-point slide operation is greater than a preset value, and controlling zooming of the displayed object according to the slide track when the feature value is greater than the preset value.

In a first possible implementation manner of the first aspect, when the feature value is the touch pressure, determining whether the feature value of at least one point in the single-point slide operation is greater than a preset value includes determining whether the touch pressure of the at least one point in the single-point slide operation is greater than the preset value.

In a second possible implementation manner of the first aspect, when the feature value is the touch pressure and the contact area, determining whether the feature value of at least one point in the single-point slide operation is greater than a preset value includes determining whether the touch pressure of the at least one point in the single-point slide operation is greater than a first preset value, and determining whether the contact area of the at least one point in the single-point slide operation is greater than a second preset value.

In a third possible implementation manner of the first aspect, when the feature value is the contact area, determining whether the feature value of at least one point in the single-point slide operation is greater than a preset value includes determining whether the contact area of the at least one point in the single-point slide operation is greater than the preset value.

In combination with the first aspect or any of the foregoing possible implementation manners, in a fourth possible implementation manner, controlling zooming of the displayed object according to the slide track includes zooming in the displayed object according to correspondence between a sliding distance and a zooming scale if it is determined, according to the slide track, that a sliding direction of the slide track moves far away from a reference point, where the reference point is a preset point on the touch screen, or zooming out the displayed object according to correspondence between a sliding distance and a zooming scale if it is determined, according to the slide track, that a sliding direction of the slide track approaches a reference point, where the reference point is a preset point on the touch screen.

In combination with the first aspect or any one of the first to the third possible implementation manners of the first aspect, in a fifth possible implementation manner, controlling zooming of the displayed object according to the slide track includes determining a value of a deflection angle and a direction of the deflection angle according to the slide track and the deflection angle formed by connecting lines from two end points of the slide track to a reference point, and zooming in or zooming out the displayed object according to the direction of the deflection angle and correspondence between a value of the deflection angle and a zooming scale, where the reference point is a preset point on the touch screen.

In a second aspect, an electronic device is provided and includes a receiving module, a parsing module, a determining module, and a control module, where the receiving module receives a single-point slide operation performed by a user on a displayed object of a touch screen, and generates a slide signal. The parsing module parses the slide signal to obtain a slide track and a feature value of the single-point slide operation, where the feature value is at least one of a touch pressure and a contact area. The determining module determines whether the feature value of at least one point in the single-point slide operation is greater than a preset value, and the control module controls zooming of the displayed object according to the slide track when the feature value is greater than the preset value.

In a first possible implementation manner of the second aspect, when the feature value is the touch pressure, the determining module determines whether the feature value of at least one point in the single-point slide operation is greater than a preset value, which includes that the determining module determines whether the touch pressure of the at least one point in the single-point slide operation is greater than the preset value.

In a second possible implementation manner of the second aspect, when the feature value is the contact area, the determining module determines whether the feature value of at least one point in the single-point slide operation is greater than a preset value, which includes that the determining module determines whether the contact area of the at least one point in the single-point slide operation is greater than the preset value.

In a third possible implementation manner of the second aspect, when the feature value is the touch pressure and the contact area, the determining module determines whether the feature value of at least one point in the single-point slide operation is greater than a preset value, which includes that the determining module determines whether the touch pressure of the at least one point in the single-point slide operation is greater than a first preset value, and the determining module determines whether the contact area of the at least one point in the single-point slide operation is greater than a second preset value.

In combination with the second aspect or any one of the foregoing possible implementation manners, in a fourth possible implementation manner, the control module controls zooming of the displayed object according to the slide track, which includes that the control module zooms in the displayed object according to correspondence between a sliding distance and a zooming scale if it is determined, according to the slide track, that a sliding direction of the slide track moves far away from a reference point, where the reference point is a preset point on the touch screen, or the control module zooms out the displayed object according to correspondence between a sliding distance and a zooming scale if it is determined, according to the slide track, that a sliding direction of the slide track approaches a reference point, where the reference point is a preset point on the touch screen.

In combination with the second aspect or any one of the first to the third possible implementation manners of the second aspect, in a fifth possible implementation manner, the control module controls zooming of the displayed object according to the slide track, which includes that the control module determines a value of a deflection angle and a direction of the deflection angle according to the slide track and the deflection angle formed by connecting lines from two end points of the slide track to a reference point, and zooms in or zooms out the displayed object according to the direction of the deflection angle and correspondence between a value of the deflection angle and a zooming scale, where the reference point is a preset point on the touch screen.

In a third aspect, an electronic device is provided and includes a processor and a touch screen, where the touch screen is configured to receive a single-point slide operation performed by a user on a displayed object of the touch screen, and generate a slide signal, and the processor parses the slide signal, obtains a slide track and a feature value of the single-point slide operation, where the feature value is at least one of a touch pressure and a contact area, determines whether the feature value of at least one point in the single-point slide operation is greater than a preset value, and controls zooming of the displayed object according to the slide track when the feature value is greater than the preset value.

In a first possible implementation manner of the third aspect, when the feature value is the touch pressure, the processor determines whether the feature value of at least one point in the single-point slide operation is greater than a preset value, which includes that the processor determines whether the touch pressure of the at least one point in the single-point slide operation is greater than the preset value.

In a second possible implementation manner of the third aspect, when the feature value is the contact area, the processor determines whether the feature value of at least one point in the single-point slide operation is greater than a preset value, which includes that the processor determines whether the contact area of the at least one point in the single-point slide operation is greater than the preset value.

In a third possible implementation manner of the third aspect, when the feature value is the touch pressure and the contact area, the processor determines whether the feature value of at least one point in the single-point slide operation is greater than a preset value, which includes that the processor determines whether the touch pressure of the at least one point in the single-point slide operation is greater than a first preset value, and the processor determines whether the contact area of the at least one point in the single-point slide operation is greater than a second preset value.

In combination with the third aspect or any one of the foregoing possible implementation manners, in a fourth possible implementation manner, the processor controls zooming of the displayed object according to the slide track, which includes that the processor zooms in the displayed object according to correspondence between a sliding distance and a zooming scale if it is determined, according to the slide track, that a sliding direction of the slide track moves far away from a reference point, where the reference point is a preset point on the touch screen, or the processor zooms out the displayed object according to correspondence between a sliding distance and a zooming scale if it is determined, according to the slide track, that a sliding direction of the slide track approaches a reference point, where the reference point is a preset point on the touch screen.

In combination with the third aspect or any one of the first to the third possible implementation manners of the third aspect, in a fifth possible implementation manner, the processor controls zooming of the displayed object according to the slide track, which includes that the processor determines a value of a deflection angle and a direction of the deflection angle according to the slide track and the deflection angle that is formed by connecting lines from two end points of the slide track to a reference point, and zooms in or zooms out the displayed object according to the direction of the deflection angle and correspondence between a value of the deflection angle and a zooming scale, where the reference point is a preset point on the touch screen.

With the electronic device and the method for controlling zooming of a displayed object according to the embodiments of the present disclosure, a slide track and a feature value of a single-point slide operation of a user are identified, and zooming of a displayed object on the touch screen is controlled when the feature value is greater than a preset value.

BRIEF DESCRIPTION OF DRAWINGS

To describe the technical solutions in the embodiments of the present disclosure more clearly, the accompanying drawings required for describing the embodiments of the present disclosure are introduced briefly in the following. The accompanying drawings in the following description show only some embodiments of the present disclosure, and a person of ordinary skill in the art can also derive other drawings from these accompanying drawings without creative efforts.

DESCRIPTION OF EMBODIMENTS

The technical solutions in the embodiments of the present disclosure are clearly described in the following with reference to the accompanying drawings in the embodiments of the present disclosure. The embodiments to be described are only a part rather than all of the embodiments of the present disclosure. All other embodiments obtained by a person of ordinary skill in the art based on the embodiments of the present disclosure without creative efforts shall fall within the protection scope of the present disclosure.

An embodiment of the present disclosure relates to an electronic device 100. The electronic device 100 may be a mobile phone, a tablet computer, a PDA, a Point of Sales (POS), or an onboard computer.

Figure 1:
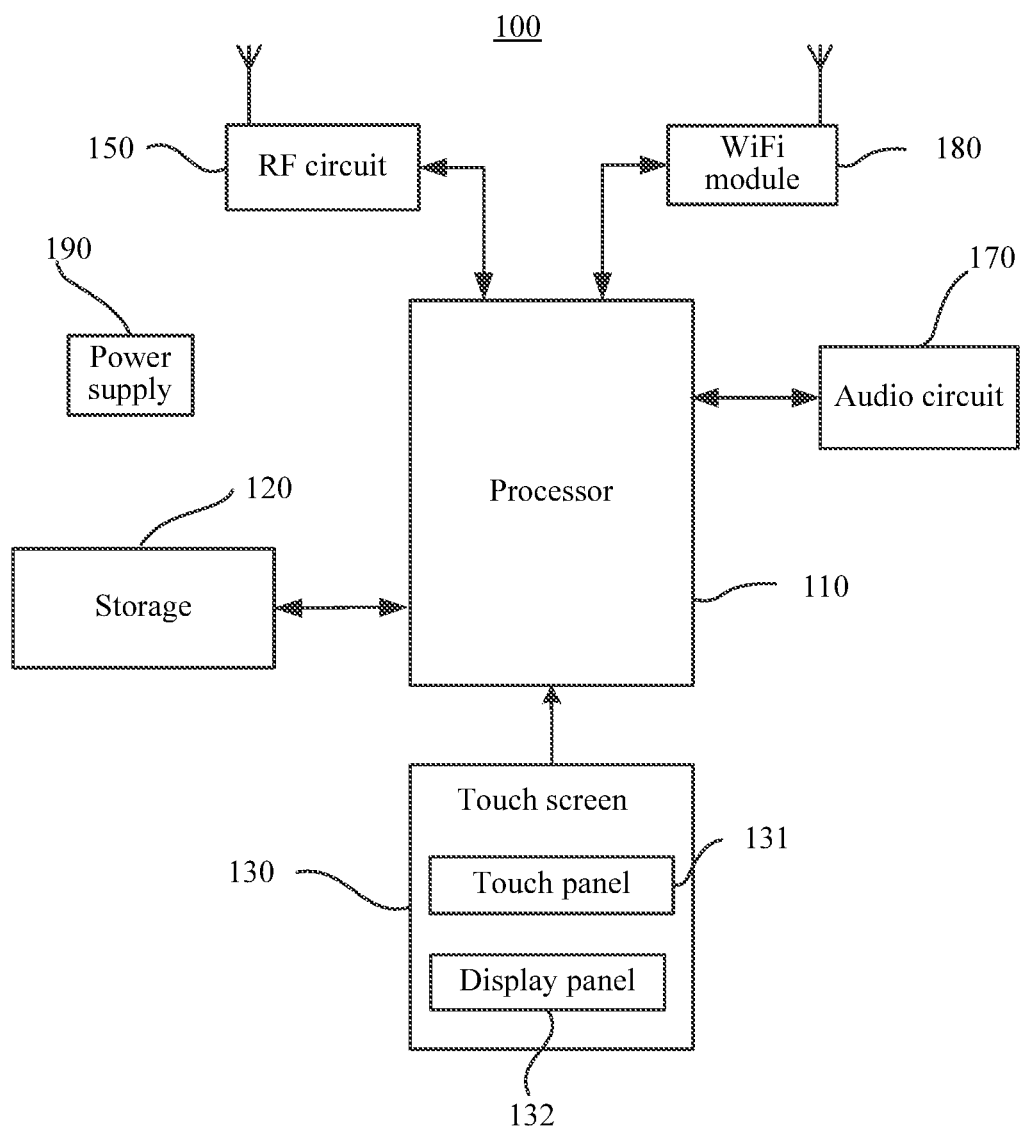
FIG. 1 is a schematic structural diagram of an electronic device according to a first embodiment of the present disclosure.

FIG. 1 is a schematic structural diagram of an electronic device 100 according to a first embodiment of the present disclosure.

Referring to FIG. 1, the electronic device 100 in the embodiment of the present disclosure includes a processor 110 and a touch screen 130. The touch screen 130 is configured to receive a single-point slide operation performed by a user on a displayed object of the touch screen 130, and generate a slide signal. The processor 110 parses the slide signal, obtains a slide track and a feature value of the single-point slide operation, where the feature value is at least one of a touch pressure and a contact area, determines whether the feature value of at least one point in the single-point slide operation is greater than a preset value, and controls zooming of the displayed object according to the slide track when the feature value is greater than the preset value.

The electronic device 100 in the embodiment of the present disclosure controls zooming of the displayed object through the slide track and the feature value of the single-point slide operation.

It can be understood that the single-point slide operation may be a single-point slide operation performed by a single finger of a user on the touch screen 130, and may also be a single-point slide operation performed by a touching object such as a touch pen on the touch screen 130.

It can also be understood that the displayed object may be an object that can be displayed by the touch screen 130, such as an image, a page, and a main interface of the screen.

In the embodiment of the present disclosure, the touch screen 130 may include a touch panel 131. The touch panel 131 may collect a touch operation performed by a user on or near the touch panel 131 (for example, the user uses any suitable object or accessory such as a finger or a touch pen to perform operation on the touch panel 131 or near the touch panel 131), and drive a corresponding connecting apparatus according to a preset program. Optionally, the touch panel 131 may include two parts, namely, a touch detection apparatus and a touch controller. The touch detection apparatus detects a touch position of the user, detects a signal generated by a touch operation, and transmits the signal to the touch controller. The touch controller receives touch information from the touch detection apparatus, converts it into touch point coordinates, and sends the touch point coordinates to the processor 110, and can receive and execute a command sent by the processor 110. In addition, the touch panel 131 may be implemented in various types such as a resistor type, a capacitor type, an infrared ray, and a surface acoustic wave.

The touch screen 130 may further include a display panel 132. The display panel 132 may be configured to display information input by the user or information provided for the user and various menu interfaces of the electronic device 100. Optionally, the display panel 132 may be configured in forms such as a Liquid Crystal Display (LCD) or an Organic Light-Emitting Diode (OLED).

In the embodiment of the present disclosure, the touch panel 131 covers the display panel 132 in order to form the touch screen 130. After detecting a touch operation on or near the touch screen 130, the touch screen 130 transmits it to the processor 110 to determine a type of a touch event, and then the processor 110 provides a corresponding visual output on the touch screen 130 according to the type of the touch event.

The electronic device 100 may further include a storage 120, which may be configured to store a software program and module. The processor 110 runs the software program and module stored in the storage 120 in order to execute various functional applications and data processing of the electronic device 100. The storage 120 may mainly include a program storage area and a data storage area. The program storage area may store an operating system, an application required by at least one function, such as a sound playing function and an image playing function, and so on. The data storage area may store data created using the electronic device 100, such as audio data and a phone book, and so on. In addition, the storage 120 may include a high-speed random access memory (RAM), and may further include a nonvolatile memory, for example, at least one magnetic disk storage device, a flash device, or other volatile solid state storage devices.

The electronic device 100 may further include components such as a Radio Frequency (RF) circuit 150, an audio circuit 170, a WIFI module 180, and a power supply 190. It can be understood by a person skilled in the art that a terminal structure shown in FIG. 1 does not impose a limitation to the electronic device 100, and may include more or less components than those shown in FIG. 1, for example, some electronic devices 100 may not have the WIFI module 180, or some components are combined, or arrangement of components is different.

The RF circuit 150 may be configured to receive and send information in an information receiving and sending or call process. Particularly, downlink information received by the RF circuit 150 from a base station is processed by the processor 110, and uplink information is sent to the base station. Generally, the RF circuit 150 includes, but is not limited to, an antenna, at least one amplifier, a transceiver, a coupler, and Low Noise Amplifier (LNA), a duplexer, and so on. In addition, the RF circuit 150 may also communicate with other devices through wireless communication and a network. The wireless communication may use any communication standard or protocol, which includes, but is not limited to, Global System for Mobile communication (GSM), General Packet Radio Service (GPRS), Code Division Multiple Access (CDMA), Wideband CDMA (WCDMA), Long Term Evolution (LTE), electronic mail, Short Messaging Service (SMS), and so on.

The audio circuit 170 further includes a loudspeaker and a microphone, and may provide an audio interface between the user and the electronic device 100. The audio circuit 170 may transmit, to the loudspeaker, an electric signal obtained by converting received audio data, and the loudspeaker converts the electric signal into a sound signal to be output. In another aspect, the microphone converts a collected sound signal into an electric signal, and the audio circuit 170 converts the electric signal into audio information after receiving the electric signal, and outputs the audio information to the RF circuit 150 to be sent to, for example, a mobile phone, or outputs the audio information to the storage 120 for further processing.

WIFI is a short-distance wireless transmission technology, the electronic device 100 may, through the WIFI module 180, help the user receive or send an electronic mail, browse a web page, and access a streaming media, and it provides wireless broadband Internet access for the user. Although FIG. 1 shows the WIFI module 180, it can be understood that it is not a necessity of the electronic device 100, and may be completely omitted according to a need without changing a range of the essence of the present disclosure.

The power supply 190 may be logically connected to the processor 110 through a power management system in order to implement, through the power management system, functions such as management of charging, discharging, and power consumption.

The processor 110 is a control center of the electronic device 100, is connected to all parts of the whole electronic device 100 using various interfaces and lines, and executes various functions of the electronic device 100 and processes data by running or executing the software program and/or module stored in the storage 120 and invoking data stored in the storage 120 in order to perform overall monitoring on the electronic device 100. Optionally, the processor 110 may include one or more processing units. Preferably, the processor 110 may be integrated with an application processor and a modulation and demodulation processor. The application processor mainly processes an operating system, a user interface, an application, and so on. The modulation and demodulation processor mainly processes wireless communication. It can be understood that the foregoing modulation and demodulation processor may not be integrated into the processor 110.

In the embodiment of the present disclosure, the processor 110 determines whether the feature value of at least one point in the single-point slide operation is greater than a preset value, which includes that the processor 110 determines whether the touch pressure of the at least one point in the single-point slide operation is greater than the preset value.

The preset value is an average pressure value generated when touch points press the touch screen 130 in a single-point slide flipping operation. It can be understood that the preset value may also be a pressure value generated when one point presses the touch screen 130 in a single-point slide flipping operation.

Optionally, the processor 110 determines whether the touch area of the at least one point in the single-point slide operation is greater than a preset value.

The preset value is an average contact area between touch points and the touch screen 130 in a single-point slide flipping operation. It can be understood that the preset value may also be a contact area generated when one point touches the touch screen 130 in a single-point slide flipping operation.

Optionally, the processor 110 determines whether the touch pressure of the at least one point in the single-point slide operation is greater than a first preset value, and determines whether the touch area of the at least one point in the single-point slide operation is greater than a second preset value.

The first preset value is the average pressure value generated when the touch points press the touch screen 130 in the single-point slide flipping operation, and the second preset value is the average contact area between the touch points and the touch screen 130 in the single-point slide flipping operation. It can be understood that the first preset value may also be the pressure value generated when one point presses the touch screen 130 in the single-point slide flipping operation, and the second preset value may also be the contact area generated when one point touches the touch screen 130 in the single-point slide flipping operation.

Further, the touch screen 130 is a capacitive touch screen, and the preset value may be preset according to experimental data. In this embodiment, that the feature value is a touch pressure and a touch area is used as an example, and it is defined that a first preset value of the touch pressure corresponds to a capacitor pressure N=85, and a second preset value of the touch area corresponds to a capacitor area $N_1=10$. The capacitor pressure is a value obtained by the processor 110 according to correspondence between a physical pressure range in which the user operates the touch screen 130 and a value range of 0-255. The capacitor area is a value obtained by the processor 110 according to correspondence between a touch area range of one point touched by the user on the touch screen 130 and a value range of 0-15.

Figure 2:
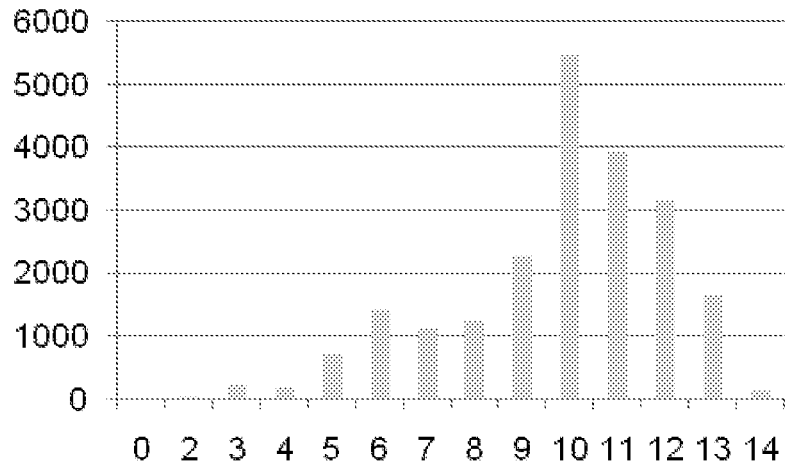
FIG. 2 is a graph of a number of touches VS a capacitor area.

For example, as shown in FIG. 2, a horizontal axis represents a capacitor area corresponding to a contact area between a single-finger normal slide operation and the touch screen 130, and a vertical axis represents the number of touches on the touch screen 130. It can be seen from FIG. 2 that the capacitor area is usually 10 in multiple touch events, and it may be preset that the capacitor area 10 is the second preset value.

Figure 3:
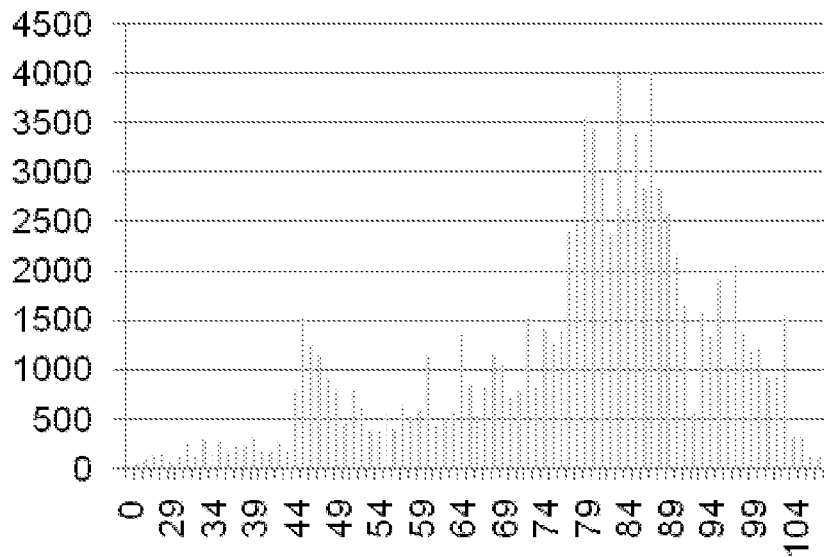
FIG. 3 is a graph of a number of touches VS a capacitor pressure.

As shown in FIG. 3, a horizontal axis represents a capacitor pressure corresponding to a pressure generated by a single-finger slide flipping operation, and a vertical axis represents the number of touches. The capacitor pressure is usually about 85 in multiple touch events. It may be preset according to the experimental data that the capacitor pressure N=85 is the first preset value.

Optionally, the processor 110 may further determine whether a feature value of at least one point in the slide track is greater than a preset value $N_1$, and determine whether a feature value of at least one point in the slide track is greater than a preset value $N_2$. The preset value $N_2$ is greater than the preset value $N_1$, the preset value $N_1$ is an average pressure value generated by the single-point slide flipping operation or an average contact area between touch points and the touch screen 130.

For example, that the feature value is a touch pressure is used as an example, and the processor 110 determines that a touch pressure of at least one point in the slide operation is greater than a preset value $N_1$=85, and a touch pressure of at least one point is greater than a preset value $N_2$=100.

Further, the processor 110 controls zooming of the displayed object according to the slide track when the feature value is greater than the preset value.

Figure 4:
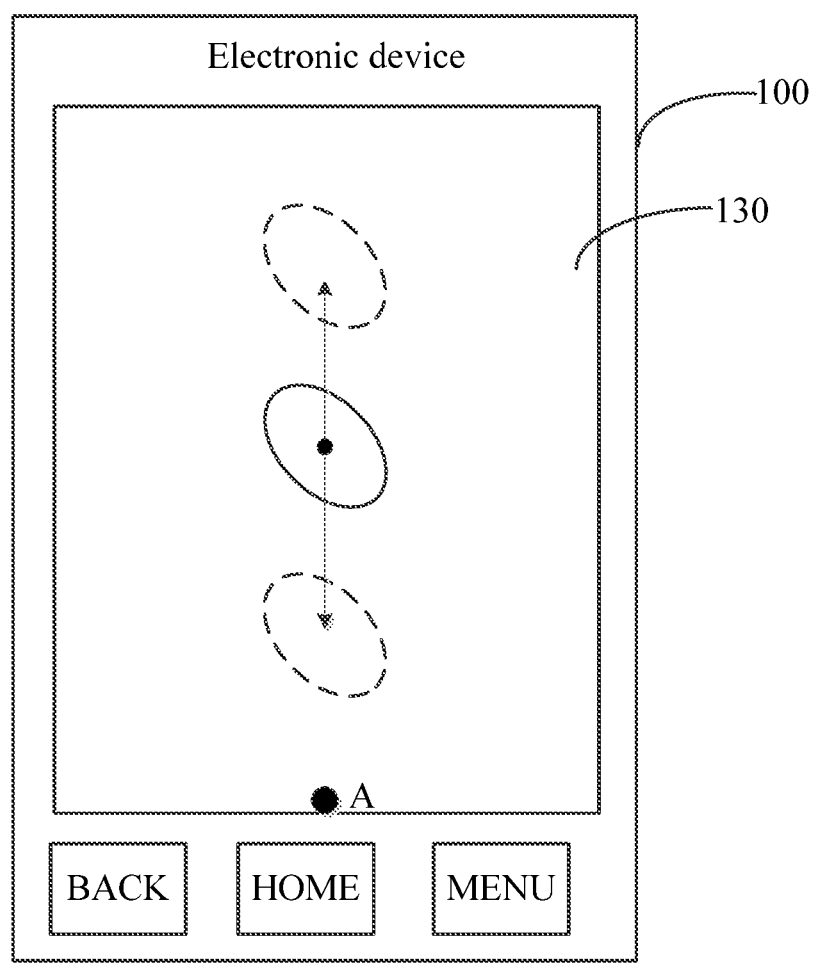
FIG. 4 is a schematic diagram that the electronic device controls zooming of a displayed object according to a sliding distance according to the first embodiment of the present disclosure.

FIG. 4 is a schematic diagram that the electronic device 100 controls zooming of a displayed object according to a sliding distance according to the first embodiment of the present disclosure.

The processor 110 may determine coordinates of each touch point of a single-point touch in a sliding process according to a central point of a single-point touch area in order to determine coordinates of a touch track formed by consecutive touch points.

The processor 110 may determine, according to the coordinates of the track, whether a sliding direction from a starting point abscissa to an end point abscissa of the coordinates of the track or a sliding direction from a starting point coordinate to an end point coordinate of the coordinates of the track moves far away from a reference point A. Zoom in the displayed object according to correspondence between a sliding distance and a zooming scale if the sliding direction moves far away from the reference point A in FIG. 4, and zoom out the displayed object according to correspondence between a sliding distance and a zooming scale if the sliding direction approaches the reference point A.

The reference point A may be a fixed point on the touch screen 130. For example, the reference point A is a middle point of a bottom edge of the touch screen, any vertex of a bottom edge of the touch screen 130 is used as the reference point A, or the reference point A may also be an initial touch point obtained in real time.

Optionally, the processor 110 may further determine a value of a deflection angle and a direction of the deflection angle according to the slide track and the deflection angle formed by connecting lines from two end points of the slide track to a reference point, and zoom in or zoom out the displayed object according to the direction of the deflection angle and correspondence between the value of the deflection angle and a zooming scale. The reference point is a preset point on the touch screen 130.

Figure 5A:
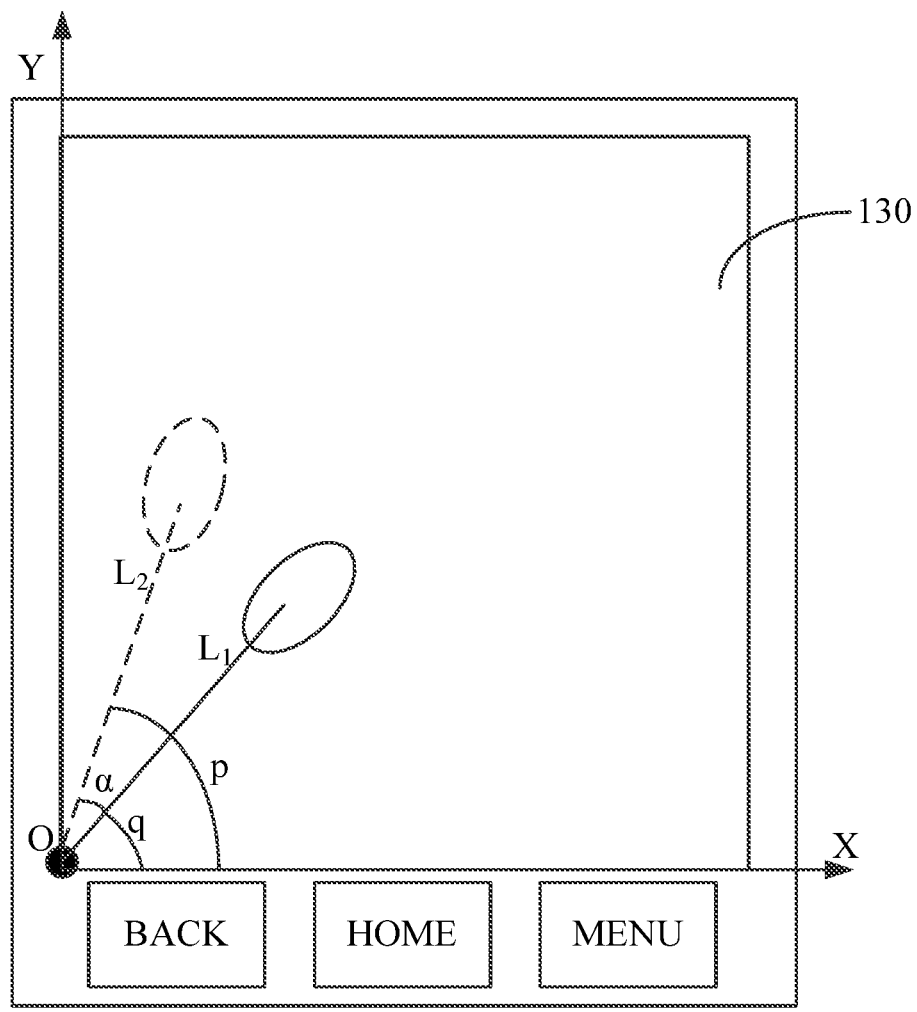
FIGS. 5A and 5B are schematic diagrams that the electronic device controls zooming of a displayed object according to a deflection angle of a slide track according to the first embodiment of the present disclosure.
Figure 5B:
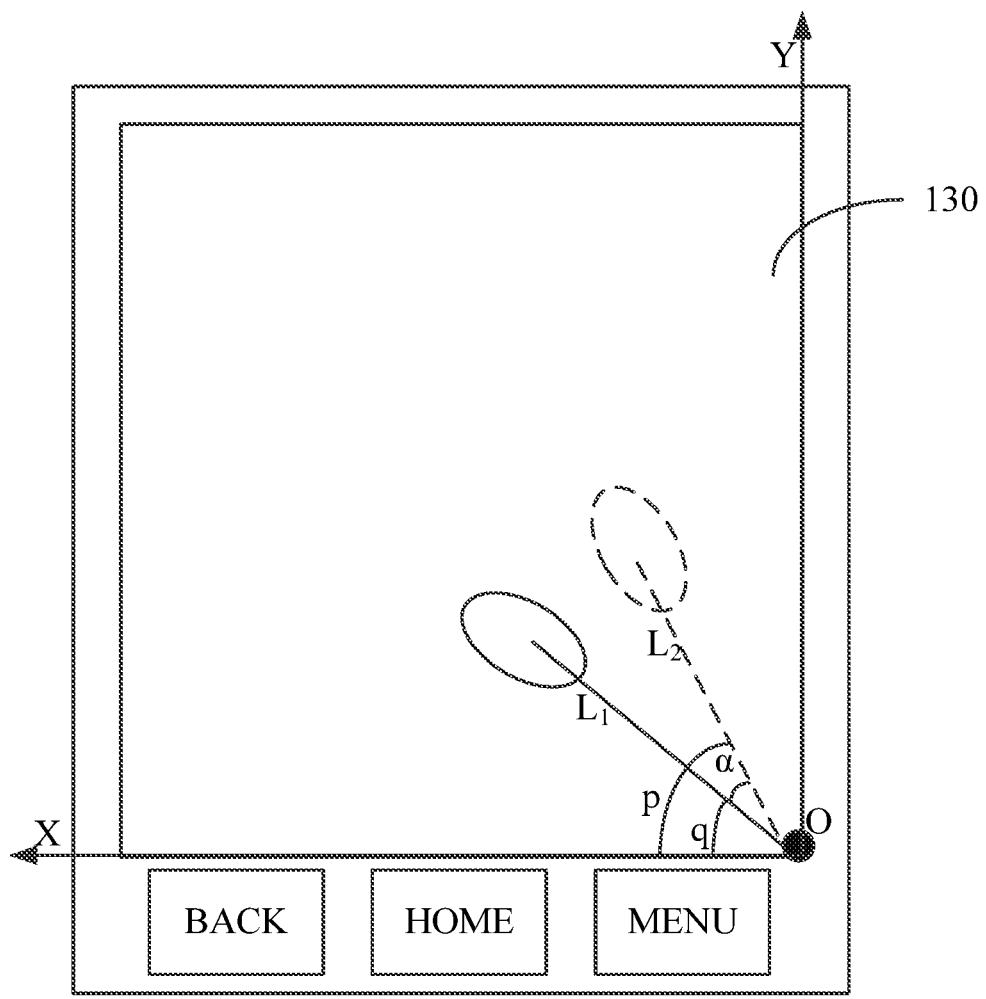

As shown in FIGS. 5A-5B, it is defined that the reference point A is an end point of the bottom edge of the touch screen 130, and it is defined that the touch screen 130 corresponds to a coordinate system XOY, the bottom edge of the touch screen 130 corresponds to an X axis of the coordinate system, an adjacent edge of the bottom edge corresponds to a Y axis, and an intersection between the bottom edge and the adjacent edge is the origin of coordinates O of the coordinate system. The processor 110 may determine starting point coordinates and end point coordinates of the slide track according to coordinates of the slide track. The processor 110 determines touch area coordinates of any point of a finger in the track, determines a connecting line of two touch points that are the farthest away from each other in the touch area, and determines a reference point A according to an angle between the connecting line and the bottom edge of the touch screen 130.

Further, when the processor 110 determines that the angle is within a preset range, for example, 0-90 degrees, the processor 110 determines that an end point close to the left hand of the user and is of the bottom edge of the touch screen 130 is set to the reference point A (as shown in FIG. 5A), and when the processor 110 determines that the angle is not within the preset range, for example, greater than 90 degrees, the processor 110 determines that an end point close to the right hand of the user and is of the bottom edge of the touch screen 130 is set to the reference point A (as shown in FIG. 5B). It is defined that a bottom edge line of the touch screen 130 is a reference line. In another manner, it may be defined that any edge line of the touch screen 130 is the reference line.

Further, the processor 110 calculates that connecting lines from a starting point and an end point of the slide track to the reference point A are a starting point line $L_1$ and an end point line $L_2$ respectively, where coordinates of the starting point are (X, Y), coordinates of the end point are $(X_i, Y_i)$, coordinates of the reference point A are $(X_0, Y_0)$, it is defined that a deflection angle of the starting point line $L_1$ relative to the bottom edge of the touch screen 130 is a reference angle q, and a calculation method is as the following formula:

$$q=\tan^{-1}(|Y-Y_0|/|X-X_0|).$$

Further, the processor 110 calculates a deflection angle of the end point line $L_2$ relative to the bottom edge of the touch screen 130, which is a current angle P, and a calculation method is as the following formula:

$$p=\tan^{-1}(|Y_i-Y_0|/|X_i-X_0|).$$

Therefore, a deflection angle of the end point line $L_2$ relative to the starting point line $L_1$ satisfies α=p−q, the processor 110 calculates that the deflection angle satisfies α≥0, determines that a direction of the deflection angle moves far away from the reference line, and zooms in the displayed object according to correspondence between the deflection angle α and a zooming scale, and if it is calculated that the deflection angle satisfies α<0, it is determined that a direction of the deflection angle approaches the reference line, and the displayed object is zoomed out.

It can be understood that the processor 110 may zoom out or zoom in the displayed object according to a center of the displayed object, or may zoom out or zoom in the displayed object with the reference point A described in the foregoing being a center, or zoom out or zoom in the displayed object with the starting point or the end point of the slide track being a center.

In the embodiment of the present disclosure, the electronic device 100 identifies the slide trajectory and the feature value of the single-point slide operation of the user, and controls zooming of the displayed object of the touch screen 130 when the feature value is greater than the preset value.

Figure 6:
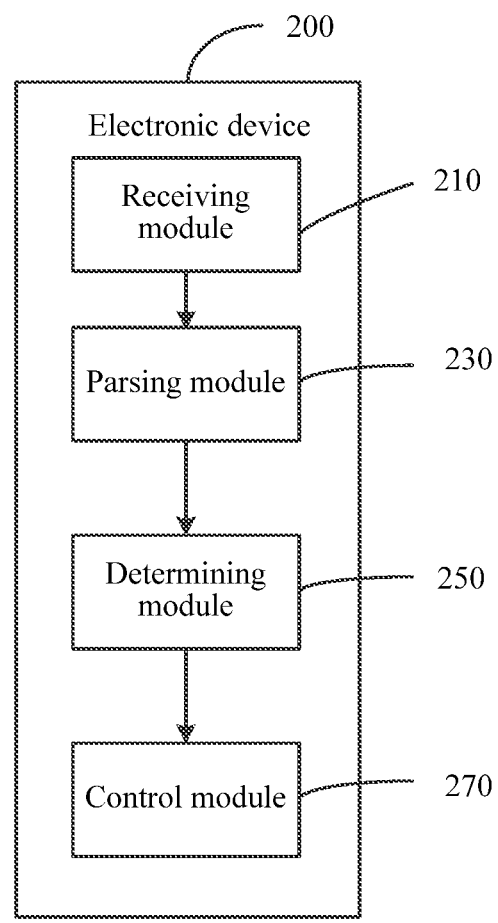
FIG. 6 is a schematic diagram of an electronic device for controlling zooming of a displayed object through a single-point slide operation according to a second embodiment of the present disclosure.

FIG. 6 is a structural diagram of an electronic device 200 for controlling zooming of a displayed object through a single-point slide operation according to a second embodiment of the present disclosure.

The electronic device 200 may include a receiving module 210, a parsing module 230, a determining module 250, and a control module 270.

The receiving module 210 receives a single-point slide operation performed by a user on a displayed object of a touch screen (not shown), and generates a slide signal.

The parsing module 230 parses the slide signal to obtain a slide track and a feature value of the single-point slide operation, where the feature value is at least one of a touch pressure and a contact area.

The determining module 250 determines whether the feature value of at least one point in the single-point slide operation is greater than a preset value.

The control module 270 controls zooming of the displayed object according to the slide track when the feature value is greater than the preset value.

In the embodiment of the present disclosure, the electronic device 200 identifies the slide track and the feature value of the single-point slide operation, and controls zooming of the displayed object of the touch screen when the feature value is greater than the preset value.

It can be understood that the single-point slide operation may be a single-point slide operation performed by a single point of a user on the touch screen, and may also be a single-point slide operation performed by a touching object such as a touch pen (not shown) on the touch screen.

The determining module 250 determines whether the feature value of at least one point in the single-point slide operation is greater than a preset value.

The determining module 250 determines whether the touch pressure of the single-point slide operation of the at least one point in the single-point slide operation is greater than the preset value.

The preset value is an average pressure value generated by touch points in a single-point slide flipping operation. It can be understood that the preset value may also be a pressure value generated when one point presses the touch screen in a single-point slide flipping operation.

Optionally, the determining module 250 determines whether the touch area of the at least one point in the single-point slide operation is greater than a preset value.

The preset value is an average contact area between touch points and the touch screen in a single-point slide flipping operation. It can be understood that the preset value may also be a contact area generated when one point touches the touch screen in a single-point slide flipping operation.

Optionally, the determining module 250 determines whether the touch pressure of the at least one point in the single-point slide operation is greater than a first preset value, and determines whether the touch area of the at least one point in the single-point slide operation is greater than a second preset value.

The first preset value is the average pressure value generated when the touch points press the touch screen in the single-point slide flipping operation, and the second preset value is the average contact area between the touch points and the touch screen in the single-point slide flipping operation. It can be understood that the first preset value may also be the pressure value generated when one point presses the touch screen in the single-point slide flipping operation, and the second preset value may also be the contact area generated when one point touches the touch screen in the single-point slide flipping operation.

Optionally, the determining module 250 may further determine whether the feature value of the at least one point in the single-point slide operation is greater than a preset value $N_1$, and determine whether the feature value of the at least one point in the single-point slide operation is greater than a preset value $N_2$. The preset value $N_2$ is greater than the preset value $N_1$, the preset value $N_1$ is an average pressure value generated by touch points in the single-point slide flipping operation or an average contact area between touch points and the touch screen.

For example, that the feature value is a touch pressure is used as an example, and the determining module 250 determines that a touch pressure of at least one point in the slide operation is greater than a preset value $N_1=85$, and a touch pressure of at least one point is greater than a preset value $N_2=100$.

Further, the control module 270 controls zooming of the displayed object according to the slide track of the single-point slide operation when the feature value is greater than the preset value, which includes that the control module 270 may determine, according to coordinates of the track, whether a sliding direction from a starting point abscissa to an end point abscissa of the coordinates of the track or a sliding direction from a starting point ordinate to an end point ordinate of the coordinates of the track moves far away from a reference point, such as the reference point A in FIG. 4. The control module 270 zooms in the displayed object according to correspondence between a sliding distance and a zooming scale if the sliding direction moves far away from the reference point, and the control module 270 zooms out the displayed object according to correspondence between a sliding distance and a zooming scale if the determining module 250 determines that the sliding direction approaches the reference point.

The reference point may be a fixed point on the touch screen. For example, the reference point is a middle point of a bottom edge of the touch screen, or any vertex of a bottom edge of the touch screen is used as the reference point, or the reference point may also be a touch point obtained in real time.

Optionally, the control module 270 may further determine a value of a deflection angle and a direction of the deflection angle according to the slide track and the deflection angle formed by connecting lines from two end points of the slide track to a reference point, and zoom in or zoom out the displayed object according to the direction of the deflection angle and correspondence between the value of the deflection angle and a zooming scale. The reference point is a preset point on the touch screen. For a process in which the control module 270 controls zooming of the displayed object according to the slide track and the deflection angle formed by the connecting lines from the two end points of the slide track to the reference point, reference is made to the description of the foregoing embodiment.

It can be understood that the control module 270 may zoom out or zoom in the displayed object according to a center of the displayed object, or may zoom out or zoom in the displayed object with the reference point described in the foregoing being a center, or zoom out or zoom in the displayed object with the starting point or the end point of the slide track being a center.

In the embodiment of the present disclosure, the electronic device 200 identifies the slide track and the feature value of the single-point slide operation of the user, and controls zooming of the displayed object of the touch screen when the feature value is greater than the preset value.

Figure 7:
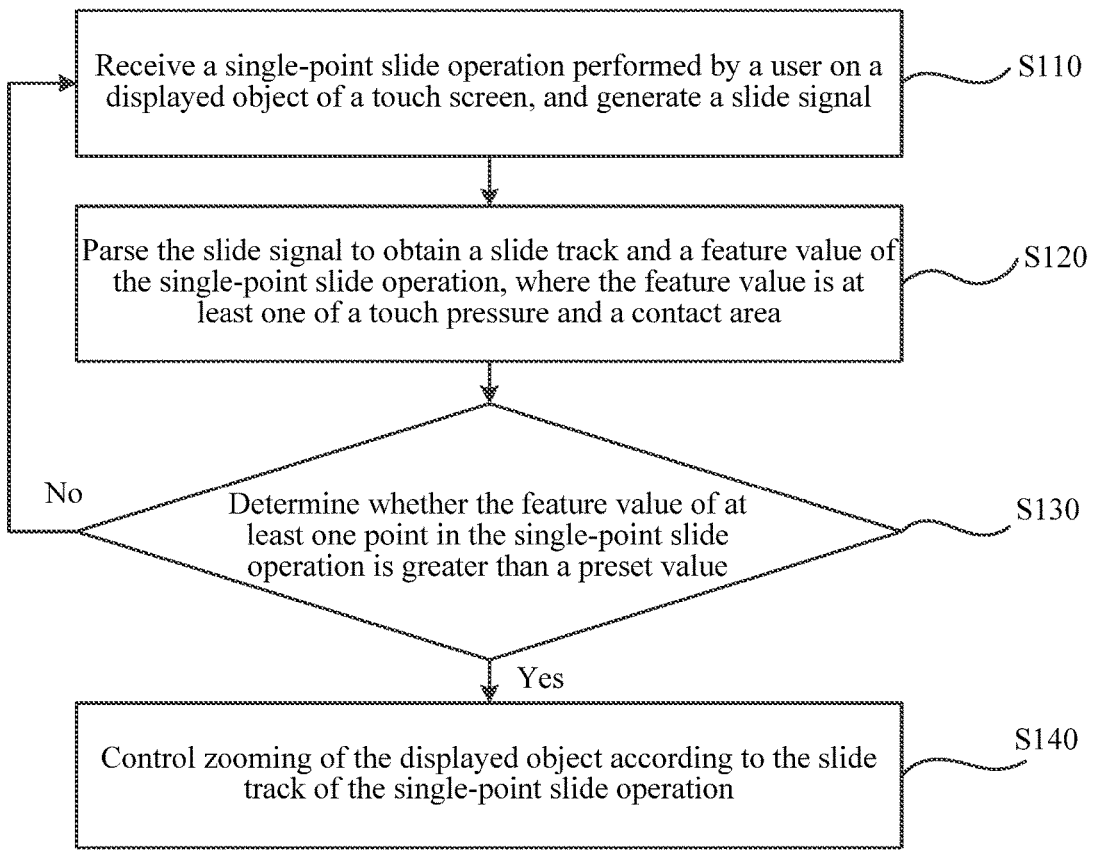
FIG. 7 is a flow chart of a method for controlling zooming of a displayed object through a single-point slide operation according to a third embodiment of the present disclosure.

FIG. 7 is a flow chart of a method for controlling zooming of a displayed object through a single-point slide operation according to a third embodiment of the present disclosure.

The method for controlling zooming of a displayed object includes the following steps.

Step S110: Receive a single-point slide operation performed by a user on a displayed object of a touch screen, and generate a slide signal.

Step S120: Parse the slide signal to obtain a slide track and a feature value of the single-point slide operation, where the feature value is at least one of a touch pressure and a contact area.

Step S130: Determine whether the feature value of at least one point in the single-point slide operation is greater than a preset value.

Further, it is determined whether the touch pressure of the at least one point in the single-point slide operation is greater than the preset value.

The preset value is an average pressure value generated by touch points in a single-point slide flipping operation. The preset value may also be a pressure value generated when one point presses the touch screen 130 in a single-point slide flipping operation.

Optionally, it is determined whether the touch area of the at least one point in the single-point slide operation is greater than a preset value.

The preset value is an average contact area between touch points and the touch screen in a single-point slide flipping operation. It can be understood that the preset value may also be a contact area generated when one point touches the touch screen in a single-point slide flipping operation.

Optionally, it is determined whether the touch pressure of the at least one point in the single-point slide operation is greater than a first preset value, and it is determined whether the touch area of the at least one point in the single-point slide operation is greater than a preset area value.

The first preset value is the average pressure value generated when the touch points press the touch screen in the single-point slide flipping operation, and the second preset value is the average contact area between the touch points and the touch screen in the single-point slide flipping operation. It can be understood that the first preset value may also be the pressure value generated when one point presses the touch screen in the single-point slide flipping operation, and the second preset value may also be the contact area generated when one point touches the touch screen in the single-point slide flipping operation.

Optionally, it may further be determined whether the feature value of the at least one point in the single-point slide operation is greater than a preset value $N_1$, and it is determined whether the feature value of the at least one point in the single-point slide operation is greater than a preset value $N_2$. The preset value $N_2$ is greater than the preset value $N_1$, the preset value $N_1$ is an average pressure value generated by touch points in the single-point slide flipping operation or an average contact area between touch points and the touch screen 130.

Perform step S140 when the feature value is greater than the preset value.

Step S140: Control zooming of the displayed object according to the slide track of the single-point slide operation.

Further, when the feature value is greater than the preset value, it is determined, according to coordinates of the track, whether a sliding direction from a starting point abscissa to an end point abscissa of the coordinates of the track or a sliding direction from a starting point ordinate to an end point ordinate of the coordinates of the track moves far away from a reference point. The displayed object is zoomed in according to correspondence between a sliding distance and a zooming scale if the sliding direction moves far away from the reference point, and the displayed object is zoomed out according to correspondence between a sliding distance and a zooming scale if the sliding direction approaches the reference point.

The reference point may be a fixed point on the touch screen. For example, the reference point is a middle point of a bottom edge of the touch screen, any vertex of a bottom edge of the touch screen is used as the reference point, or the reference point may also be a touch point obtained in real time.

Optionally, when the feature value is greater than the preset value, a value of a deflection angle and a direction of the deflection angle are determined according to the slide track and the deflection angle that is formed by connecting lines from two end points of the slide track to a reference point, and the displayed object is zoomed in or zoomed out according to the direction of the deflection angle and correspondence between the value of the deflection angle and a zooming scale. The reference point is a preset point on the touch screen.

For a process in which zooming of the displayed object is controlled according to the slide track and the deflection angle that is formed by the connecting lines from the two end points of the slide track to the reference point, reference is made to the description of the foregoing embodiment.

It can be understood that the controlling zooming of the displayed object includes that the displayed object may be zoomed out or zoomed in according to a center of the displayed object, or the displayed object may be zoomed out or zoomed in with the reference point described in the foregoing being a center, or the displayed object is zoomed out or zoomed in with the starting point or the end point of the slide track being a center.

With the method for controlling zooming of a displayed object according to the embodiment of the present disclosure, the slide track and the feature value of the single-point slide operation of the user are identified, and zooming of the displayed object of the touch screen is controlled when the feature value is greater than the preset value.

Figure 8:
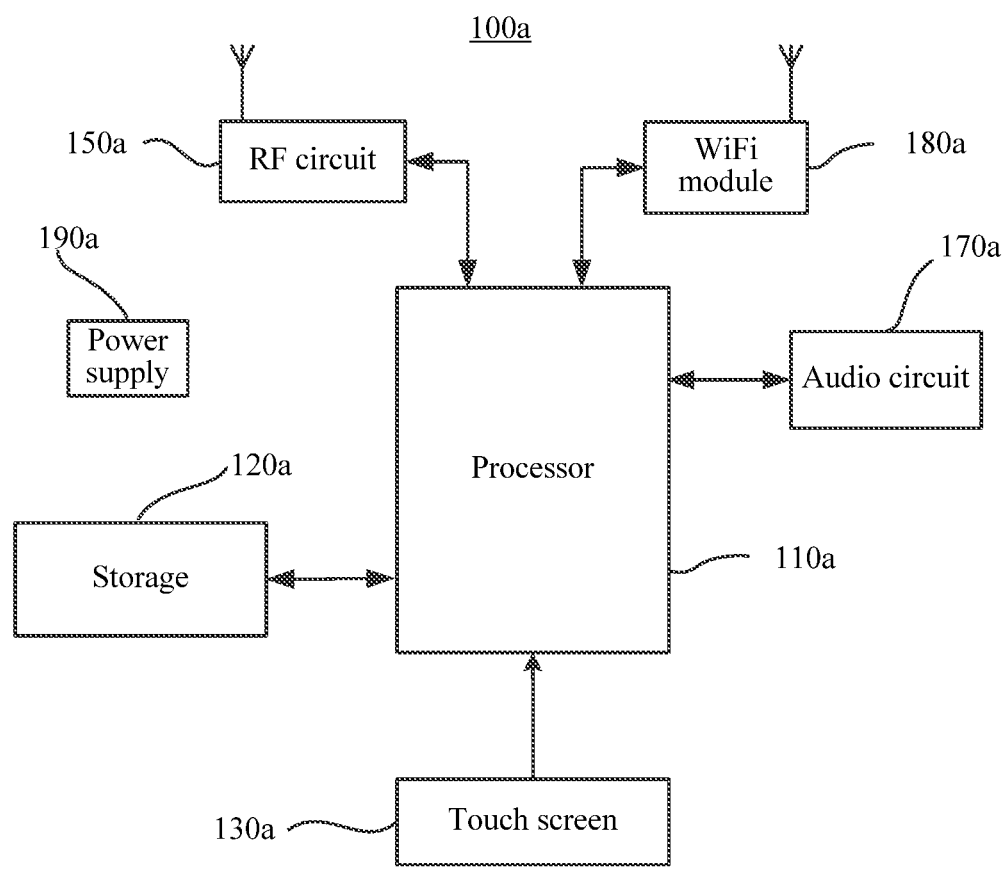
FIG. 8 is a structural diagram of an electronic device for controlling zooming of a displayed object according to a fourth embodiment of the present disclosure.

FIG. 8 is a structural diagram of an electronic device 100a for controlling zooming of a displayed object according to a fourth embodiment of the present disclosure.

The electronic device 100a includes a processor 110a and a touch screen 130a. The touch screen 130a receives a click operation performed by a user on the touch screen 130a, and generates a click signal.

The processor 110a parses the click signal to obtain the number of clicks of the click operation or obtain a click time for clicking the touch screen 130a, controls zooming in or zooming out of a displayed object according to correspondence between a preset number and a zooming scale if the number of clicks is the preset number, or controls zooming out or zooming in of a displayed object according to correspondence between the click time and a zooming scale if the click time reaches a preset time.

Further, the processor 110a controls zooming in of the displayed object according to the correspondence between the preset number and the zooming scale if the number of clicks is the preset number, for example, double-click, and controls zooming out of the displayed object according to the correspondence between the click and the zooming scale if the click reaches the preset time.

Optionally, the processor 110a controls zooming out of the displayed object according to the correspondence between the preset number and the zooming scale if the number of clicks is the preset number, and controls zooming in of the displayed object if the click time reaches the preset time.

For example, if the click operation is an operation of double-clicking the touch screen 130a, the processor 110a correspondingly zooms in the displayed object by 5% according to the operation of double-clicking the touch screen 130a. The user double-clicks the touch screen 130a again, the processor 110a further zooms in the displayed object by 5%, or zooming in the displayed object by 5% on the basis of the displayed object that is zoomed in by 10%, and so on. In order to zoom out the displayed object, the user may click the displayed object, and the processor 110a zooms out the displayed object according to correspondence between the click time and a zooming-out scale.

It can be understood that the processor 110a may zoom out or zoom in the displayed object according to a center of the displayed object, or may zoom out or zoom in the displayed object with the reference point described in the foregoing being a center, or zoom out or zoom in the displayed object with a starting point or an end point of a slide track being a center.

The electronic device 100a may further include an RF circuit 150a, a WIFI module 180a, a power supply 190a, an audio circuit 170a, and a storage 120a. The processor 110a controls the RF circuit 150a, the WIFI module 180a, the power supply 190a, the audio circuit 170a, and the storage 120a.

In the embodiment of the present disclosure, the electronic device 100a identifies the preset number or the click time of the click operation performed by the user on the touch screen 130a in order to control zooming out or zooming in of the displayed object.

Figure 9:
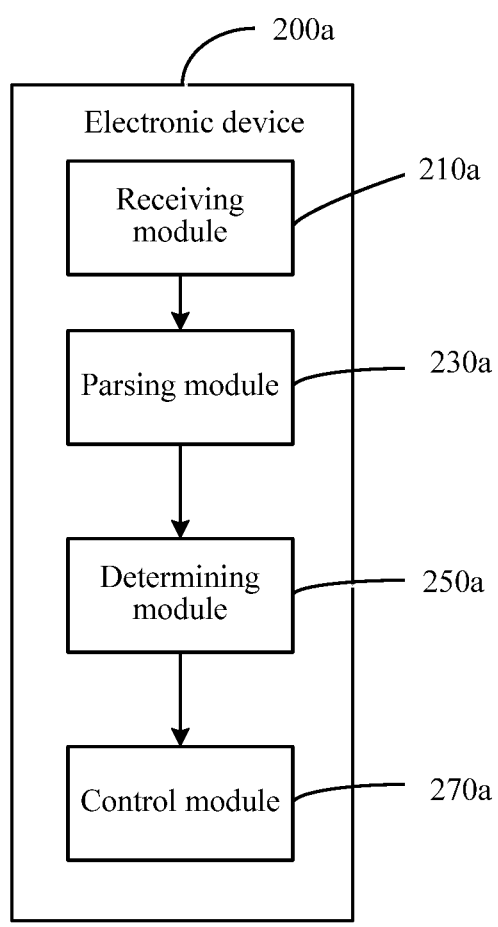
FIG. 9 is a structural diagram of an electronic device for controlling zooming of a displayed object according to a fifth embodiment of the present disclosure.

FIG. 9 is a structural diagram of an electronic device 200a for controlling zooming of a displayed object according to a fifth embodiment of the present disclosure.

In this embodiment, the electronic device 200a may include a receiving module 210a, a parsing module 230a, a determining module 250a, and a control module 270a.

The receiving module 210a receives a click operation performed by a user on a displayed object of a touch screen (not shown), and generates a click signal.

The parsing module 230a parses the click signal to obtain the number of clicks of the click operation or a click time for clicking the touch screen.

The determining module 250a determines that the number of clicks is a preset number or determines that the click time reaches a preset time.

The control module 270a controls zooming in or zooming out of the displayed object according to correspondence between the preset number and a zooming scale, or controls zooming out or zooming in of the displayed object according to correspondence between the click time and a zooming scale.

Further, the determining module 250a determines that the click operation is the preset number of single-point continuous clicks on the touch screen, for example, double-click, and the control module 270a controls zooming in of the displayed object according to the correspondence between the preset number and the zooming scale, and the determining module 250a determines that the click time of the click operation reaches the preset time, and the control module 270a controls zooming out of the displayed object according to the correspondence between the click time and the zooming scale.

Optionally, the determining module 250a determines that the click operation is the preset number of single-point continuous clicks on the touch screen, for example, double-click, and the control module 270a controls zooming out of the displayed object according to the correspondence between the preset number and the zooming scale, and the determining module 250a determines that the click time of the click operation reaches the preset time, and the control module 270a controls zooming in of the displayed object according to the correspondence between the click time and the zooming scale.

Further, the control module 270a may zoom out or zoom in the displayed object according to a center of the displayed object, or may zoom out or zoom in the displayed object with the reference point described in the foregoing being a center, or zoom out or zoom in the displayed object with a starting point or an end point of a slide track being a center.

In the embodiment of the present disclosure, the electronic device 200a identifies the preset number or the click time of the click operation performed by the user in order to control zooming in or zooming out of the displayed object.

Figure 10:
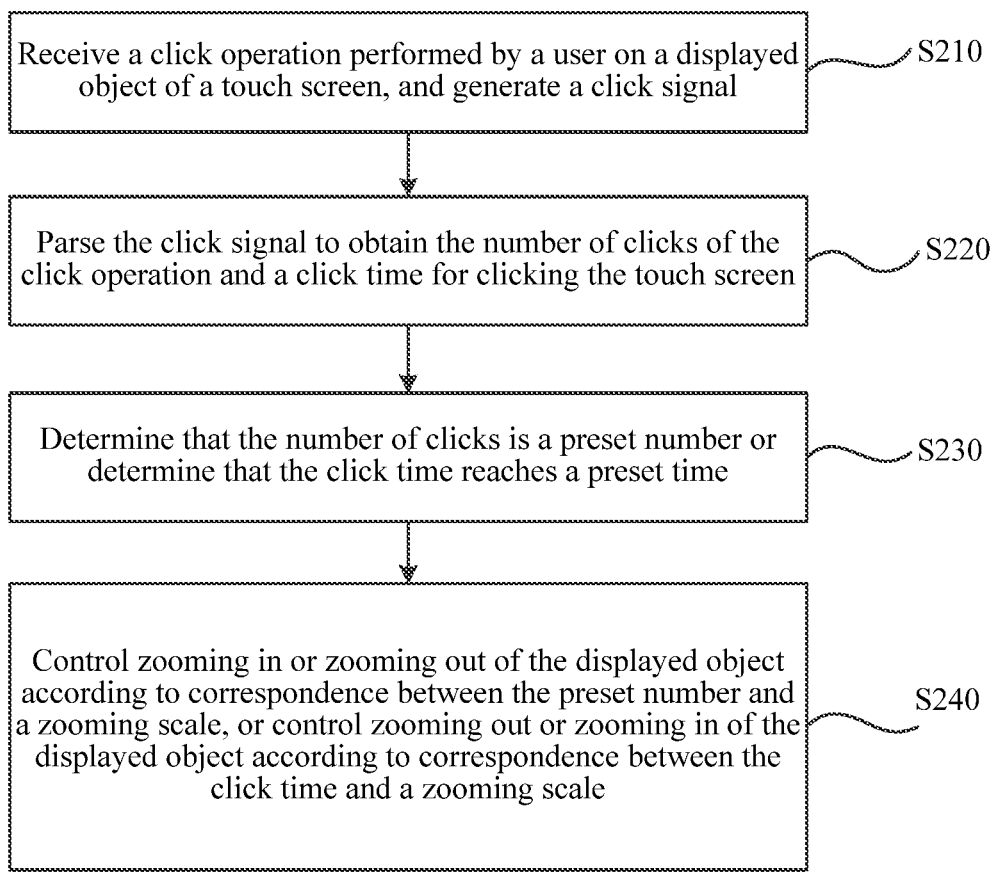
FIG. 10 is a flow chart of a method for controlling zooming of a displayed object through a single-point slide operation according to a sixth embodiment of the present disclosure.

FIG. 10 is a flow chart of a method for controlling zooming of a displayed object according to a sixth embodiment of the present disclosure and the method includes the following steps.

Step S210: Receive a click operation performed by a user on a displayed object of a touch screen, and generate a click signal.

Step S220: Parse the click signal to obtain the number of clicks of the click operation and a click time for clicking the touch screen.

Step S230: Determine that the number of clicks is a preset number or determine that the click time reaches a preset time.

Step S240: Control zooming in or zooming out of the displayed object according to correspondence between the preset number and a zooming scale, or control zooming out or zooming in of the displayed object according to correspondence between the click time and a zooming scale.

Further, if the click operation is the preset number of single-point continuous clicks on the touch screen, for example, double-click, zooming in of the displayed object is controlled according to the correspondence between the preset number and the zooming scale, and zooming out of the displayed object is controlled according to the correspondence between the click time and the zooming scale if the click time of the click operation reaches the preset time.

Optionally, if the click operation is the preset number of single-point continuous clicks on the touch screen, for example, double-click, zooming out of the displayed object is controlled according to the correspondence between the preset number and the zooming scale, and zooming in of the displayed object is controlled according to the correspondence between the click time and the zooming scale if the click time of the click operation reaches the preset time.

Further, the zooming of the displayed object is controlled, which includes that the displayed object may be zoomed out or zoomed in according to a center of the displayed object, or the displayed object may be zoomed out or zoomed in with the reference point A described in the foregoing being a center, or the displayed object is zoomed out or zoomed in with a starting point or an end point of a slide track being a center.

With the method for controlling zooming of a displayed object according to the embodiment of the present disclosure, the preset number of the click operation performed by the user or the click time for clicking the touch screen is identified in order to control zooming in or zooming out of the displayed object.

It can be understood that the foregoing steps may be executed by a terminal, and the terminal may be the electronic devices 100, 100a, 200 and 200a described in the foregoing embodiments, and may also be another electronic device such as a mobile phone, a tablet computer, or a PDA.

It should be noted that the steps of the methods and modules described in the embodiments disclosed in the specification may be implemented through electronic hardware or a combination of computer software and hardware. The steps and components of each embodiment are generally described according to functions in the foregoing description. Whether these functions are executed in a form of hardware or in a form of software and hardware depends upon particular applications and design constraint conditions of the technical solutions. A person of ordinary skill in the art may implement the described functions using a different method for each particular application, but it should not be considered that such implementation goes beyond the scope of the present disclosure.

The methods or the steps described with reference to the embodiments disclosed in the specification may be implemented by hardware, a software program executed by a processor, or a combination of the two. The software program may be placed in a RAM, a memory, a read-only memory (ROM), an electrically programmable ROM, an electrically erasable programmable ROM, a register, a hard disk, a removable magnetic disk, a compact disc ROM (CD-ROM), or any storage medium of other forms well-known in the technical field.

Although the present disclosure has been described in detail with reference to the accompanying drawings and exemplary embodiments, the present disclosure is not limited to this. A person of ordinary skill in the art may make various equivalent modifications or replacements to the embodiments of the present disclosure without departing from the spirit and essence of the present disclosure, and these modifications or replacements shall all fall within the scope of the present disclosure.

What is claimed is:

1. A method for controlling zooming of a displayed object, comprising:
   receiving a slide operation from a user on the displayed object of a touch screen;
   calculating a starting point line ($L_1$) of the slide operation, the $L_1$ extending from a reference point to a starting point of the slide operation, the reference point having coordinates ($X_0$, $Y_0$), and the starting point having coordinates (X, Y);
   calculating an end point line ($L_2$) of the slide operation, the $L_2$ extending from the reference point to an ending point of the slide operation, and the ending point having coordinates ($X_i$, $Y_i$);
   calculating a reference angle (q) according to an equation $q=\tan^{-1}(|Y-Y_0|/|X-X_0|)$;
   calculating a current angle (p) according to an equation $p=\tan^{-1}(|Y_i-Y_0|/|X_i-X_0|)$;
   calculating a deflection angle ($\alpha$) according to an equation $\alpha=p-q$;
   zooming in the displayed object when the $\alpha$ is less than zero; and
   zooming out the displayed object when the $\alpha$ is greater than or equal to zero.

2. The method of claim 1, wherein the slide operation is parsed to obtain a slide track.

3. The method of claim 1, wherein a touch point in the click operation is a last touch point in the click operation.

4. The method of claim 1, wherein zooming the displayed object comprises zooming the displayed object according to a correspondence between a preset number and a first zooming scale, and a center point of the displayed object is at a center.

5. The method of claim 1, wherein the reference point on the touch screen comprises a bottom edge of the touch screen.

6. The method of claim 1, wherein the reference point on the touch screen comprises a center of the touch screen.

7. The method of claim 1, wherein the reference point on the touch screen comprises a vertex of the touch screen.

8. An electronic device, comprising:
   a touch screen configured to receive a slide operation from a user on a displayed object of the touch screen; and
   a processor coupled to the touch screen and configured to:
      calculate a starting point line ($L_1$) of the slide operation, the $L_1$ extending from a reference point to a starting point of the slide operation, the reference point having coordinates ($X_0$, $Y_0$), and the starting point having coordinates (X, Y);
      calculate an end point line ($L_2$) of the slide operation, the $L_2$ extending from the reference point to an ending point of the slide operation, and the ending point having coordinates ($X_i$, $Y_i$);
      calculate a reference angle (q) according to an equation $q=\tan^{-1}(|Y-Y_0|/|X-X_0|)$;
      calculate a current angle (p) according to an equation $p=\tan^{-1}(|Y_i-Y_0|/|X_i-X_0|)$;
      calculate a deflection angle ($\alpha$) according to an equation $\alpha=p-q$;
      controlling zooming in of the displayed object when the $\alpha$ is less than zero; and
      controlling zooming out of the displayed object when the $\alpha$ is greater than or equal to zero.

9. The electronic device of claim 8, where the slide operation is parsed to obtain a slide track.

10. The electronic device of claim 8, wherein a touch point in the click operation is a last touch point in the click operation.

11. The electronic device of claim 8, wherein the processor is further configured to control zooming the displayed object according to a correspondence between a preset number and a first zooming scale, and a center point of the displayed object is at a center.

12. The electronic device of claim 8, wherein the reference point on the touch screen comprises a bottom edge of the touch screen.

13. The electronic device of claim 8, wherein the reference point on the touch screen comprises a center of the touch screen.

14. The electronic device of claim 8, wherein the reference point on the touch screen comprises a vertex of the touch screen.

* * * * *